US010417414B2

(12) United States Patent
Striem-Amit

(10) Patent No.: US 10,417,414 B2
(45) Date of Patent: Sep. 17, 2019

(54) BASELINE CALCULATION FOR FIREWALLING

(71) Applicant: Cybereason Inc., Boston, MA (US)

(72) Inventor: Yonatan Striem-Amit, Gedera (IL)

(73) Assignee: CYBEREASON, INC., Boston, MA (US)

( * ) Notice: Subject to any disclaimer, the term of this patent is extended or adjusted under 35 U.S.C. 154(b) by 166 days.

(21) Appl. No.: 15/386,244

(22) Filed: Dec. 21, 2016

(65) Prior Publication Data

US 2017/0193222 A1      Jul. 6, 2017

Related U.S. Application Data

(60) Provisional application No. 62/273,729, filed on Dec. 31, 2015.

(51) Int. Cl.
*G06F 21/53* (2013.01)
*H04L 29/06* (2006.01)
*G06F 21/56* (2013.01)

(52) U.S. Cl.
CPC ............ *G06F 21/53* (2013.01); *G06F 21/566* (2013.01); *H04L 63/0263* (2013.01); *H04L 63/145* (2013.01)

(58) Field of Classification Search
CPC ...... G06F 21/53; G06F 21/566; G06F 21/552; G06F 11/3688; G06F 11/3612; G06F 11/302; G06F 11/3409; G06F 11/3466; G06F 2201/865; G06F 2201/86; G06F 2201/2149; G06F 2009/45587;
(Continued)

(56) References Cited

U.S. PATENT DOCUMENTS 7,954,090 B1 * 5/2011 Qureshi ................ G06F 11/079
717/127
9,411,955 B2 * 8/2016 Jakobsson ............... G06F 21/55
(Continued)

OTHER PUBLICATIONS

"App Sandbox in Depth", Apple Developer, Sep. 13, 2016 (hereinafter AppSandbox) (Year: 2016).*
(Continued)

*Primary Examiner* — Farid Homayounmehr
*Assistant Examiner* — Raied A Salman
(74) *Attorney, Agent, or Firm* — Robert P. Greenspoon; Flachsbart & Greenspoon LLC

(57) ABSTRACT

A method, computer program product, and apparatus for performing baseline calculations for firewalling in a computer network is disclosed. The method involves defining a reference group for an executed software program, measuring signals in the reference group, measuring signals of the program, computing a distance between the signals of the program and the signals of the reference group, and taking an action if the computed distance deviates from a norm mode. The distance can be computed using a similarity matrix or other method. Measuring the program comprises observing behaviors of the program, collecting and analyzing data, comparing the data to baselines of the reference group, and comparing the behaviors of the program across a previous execution of the program. In cases where a program is known to be malicious, a reference group is not needed and a sandbox can be tailored just by copying the environment of the actual system.

22 Claims, 7 Drawing Sheets

(58) Field of Classification Search
CPC ....... G06F 2221/2119; G06F 17/30905; G06F 17/30896; G06F 3/04847; G06F 3/04842; H04L 63/0263; H04L 63/145; H04L 63/105; H04L 63/20; H04L 63/1416; H04L 63/0227; H04L 67/303; H04L 43/0876
USPC .......................................... 726/23; 714/38.1
See application file for complete search history.

(56) References Cited

U.S. PATENT DOCUMENTS

| | | | |
|---|---|---|---|
| 10,019,570 B2* | 7/2018 | Wang | G06F 21/53 |
| 10,031,832 B1* | 7/2018 | Bastien | G06F 11/3688 |
| 2006/0021029 A1* | 1/2006 | Brickell | G06F 21/51 726/22 |
| 2011/0225647 A1* | 9/2011 | Dilley | H04L 63/0218 726/14 |
| 2015/0254457 A1* | 9/2015 | Wade | G06F 21/54 726/1 |
| 2015/0347617 A1* | 12/2015 | Weinig | G06F 16/9577 715/234 |
| 2016/0294851 A1* | 10/2016 | Langton | H04L 63/1416 |
| 2017/0034199 A1* | 2/2017 | Zaw | H04L 63/1433 |
| 2017/0193222 A1* | 7/2017 | Striem-Amit | G06F 21/53 |
| 2017/0346838 A1* | 11/2017 | Langton | H04L 63/1416 |

OTHER PUBLICATIONS

A. Moser, C. Kruegel, E. Kirda, "Exploring Multiple Execution Paths for Malware Analysis", May 1, 2007, 2007 IEEE Symposium on Security and Privacy (SP '07) (pp. 231-245), 2007.*

Ekta Gandotra et al., "Malware Analysis and Classification:A Survey", "https://file.scirp.org/pdf/JIS_2014040110394271.pdf", 2014, Journal of Information Security, 5, pp. 56-64.*

Apple Developer, "App Sandbox in Depth", Sep. 2013, Apple Developer, , "https://developer.apple.com/library/archive/documentation/Security/Conceptual/AppSandboxDesignGuide/AppSandboxInDepth/AppSandboxInDepth.html#//apple_ref/doc/uid/TP40011183-CH3-SW4", pp. 1-15.*

FireEye® Dynamic Threat Intelligence™ Datasheet, 2013 http://www.threatprotectworks.com/datasheets/fireeye-dynamic-threat-intelligence-cloud.pdf.

Tanium—Endpoint Security and Systems Management, 2017 https://www.tanium.com/.

Similarity Measure Wikipedia Entry, Nov. 2016 https://en.wikipedia.org/wiki/Similarity_measure.

* cited by examiner

BASELINE CALCULATION FOR FIREWALLING

This application claims the benefit of U.S. Provisional Application No. 62/273,729, filed Dec. 31, 2015, the entire disclosure of which is herein incorporated by reference.

TECHNICAL FIELD OF THE INVENTION

The present invention relates to computer security, and more specifically to baseline calculation for firewalling.

BACKGROUND OF THE INVENTION

Sandboxing is a widely used method for detecting and preventing various undesired actions on a computer system. Broadly speaking, sandboxing consists of running a program or testing an action in an instrumented environment in order to measure, test and discover undesired consequences.

Sandboxes are a longstanding paradigm. Sandboxes have been used in malware detection at the OS level (for example FireEye is an advanced type of sandbox) as well as in other applications such as browsers (Chrome) or computing languages (such as Java).

Typically, sandboxes are well instrumented. Such measurements can include, memory use (for example overflows, access of unallocated memory etc.), disk usage, CPU usage and many other metrics.

Use of Heuristics in Sandboxing

Currently, sandboxes use many heuristics to define a score for a program or activity. Such as score is known as a badness score since it measures how likely a program is to be bad. These heuristics include:

File Emulation: file emulation allows the file to run in a controlled virtual system (or "sandbox") to see what it does.

File Analysis: File analysis involves the software taking an in-depth look at the file and trying to determine its intent, destination, and purpose.

Generic Signature Detection: This technique is particularly designed to locate variations of viruses. Several viruses are re-created and make themselves known by a variety of names, but essentially come from the same family (or classification). Genetic detection uses previous antivirus definitions to locate these similar "cousins" even if they use a slightly different name or include some unusual characters.

Many of these systems are created to be as general as possible in order to detect variations on attacks (e.g., a variant of a previously detected virus). However, even these general methods are extremely lacking in context. For example, given different versions of software (e.g., Adobe) a general sandbox does not know which version is actually installed on the system it is trying to defend. As such it is harder to optimize the sandbox to deal with the actual programs used by the system.

In addition the severity and uniqueness is unclear. Static deployments are often lacking of context. For example, it is useful to know whether a given event is a common occurrence on the system or this is the first time such an event happens. Such knowledge allows for better ranking of threats and reduction of false positives.

Thus, the current sandboxes are not adapted to the individual system which they are protecting, the sandboxes do not learn and modify their rules based on actual behavior in the network and are not tailored to the individual system.

Even such advances sandboxes such as FireEye do not tailor their sandboxes to individual systems. For example, FireEye states "The FireEye® Dynamic Threat Intelligence™ (DTI) cloud is a global network that connects FireEye threat prevention platforms to provide a real-time exchange of threat data on today's cyber attacks . . . . The FireEye DTI cloud serves as a global distribution hub to efficiently share auto-generated threat intelligence such as new malware profiles, vulnerability exploits, and obfuscation tactics, as well as new threat findings from the FireEye APT Discovery Center and verified third-party security feeds."
(http://www.threatprotectworks.com/datasheets/fireeye-dynamic-threat-intelligence-cloud.pdf, last accessed Dec. 16, 2016).

However, in order to optimize threat analysis and detection, it is important to actually restrict the network to subset of computers which share common software and potentially even hardware. Such restriction while limiting the amount of data available can enable higher quality threat detection.

Thus there is a need for sandboxes which are tailored to the actual system which is being protected. This includes use of the programs on the system and the way in which the programs are used in order to calibrate the system.

SUMMARY OF THE INVENTION

The key innovation of the present invention is that sandboxes today are sold as commodity and do not take into account anything about the actual network they are defending. By making a sandbox based on what is actually in the network, a security protocol can reduce mistakes and increase resources.

Embodiments of the present invention describe how to perform baseline calculations for tailored sandboxes. Particularly, these embodiments characterize how to use local data to calibrate, prioritize and analyze sandbox parameters. As such, the present invention improves computer technology, and the functioning of the computer itself.

Baseline

The first thing that a tailored sandbox can do is to measure the programs which are running on a system. For example, if Adobe version 9 is running on all computers in a system, then sandboxing using a different version of Adobe is not necessary. Furthermore, beyond just discovering and measuring the programs on a system, it is possible to measure the effects that a running program creates. For example, if there are never memory overruns in a program, the first memory overrun is far more suspicious than if memory overruns are common.

Thus collecting a baseline of such things include which versions of which programs are running on which machines, how often these programs are used, what effects and changes happen when the program is run.

This can be useful to adjust the sandbox settings such as which versions are used to test programs, how often sandboxing is done, duration of sandboxing, priorities of sandbox as well as other parameters.

Data collection can be done in many ways. For example, a centralized server can be used. This is a solution which is used in many applications and closely parallels the centralized use of sandboxes by such companies as FireEye. Alternatively, a distributed system can be used. In a distributed system computers can pass information between themselves. For example, Tanium (https://www.titanium.com/— last accessed Dec. 16, 2016) is a distributed system which collects information between computers to allow visibility of where programs are running and allow visibility of the system. Such visibility can be used to calibrate a sandbox to match the programs in a system.

DETAILED DESCRIPTION OF INVENTION

Figure 1:
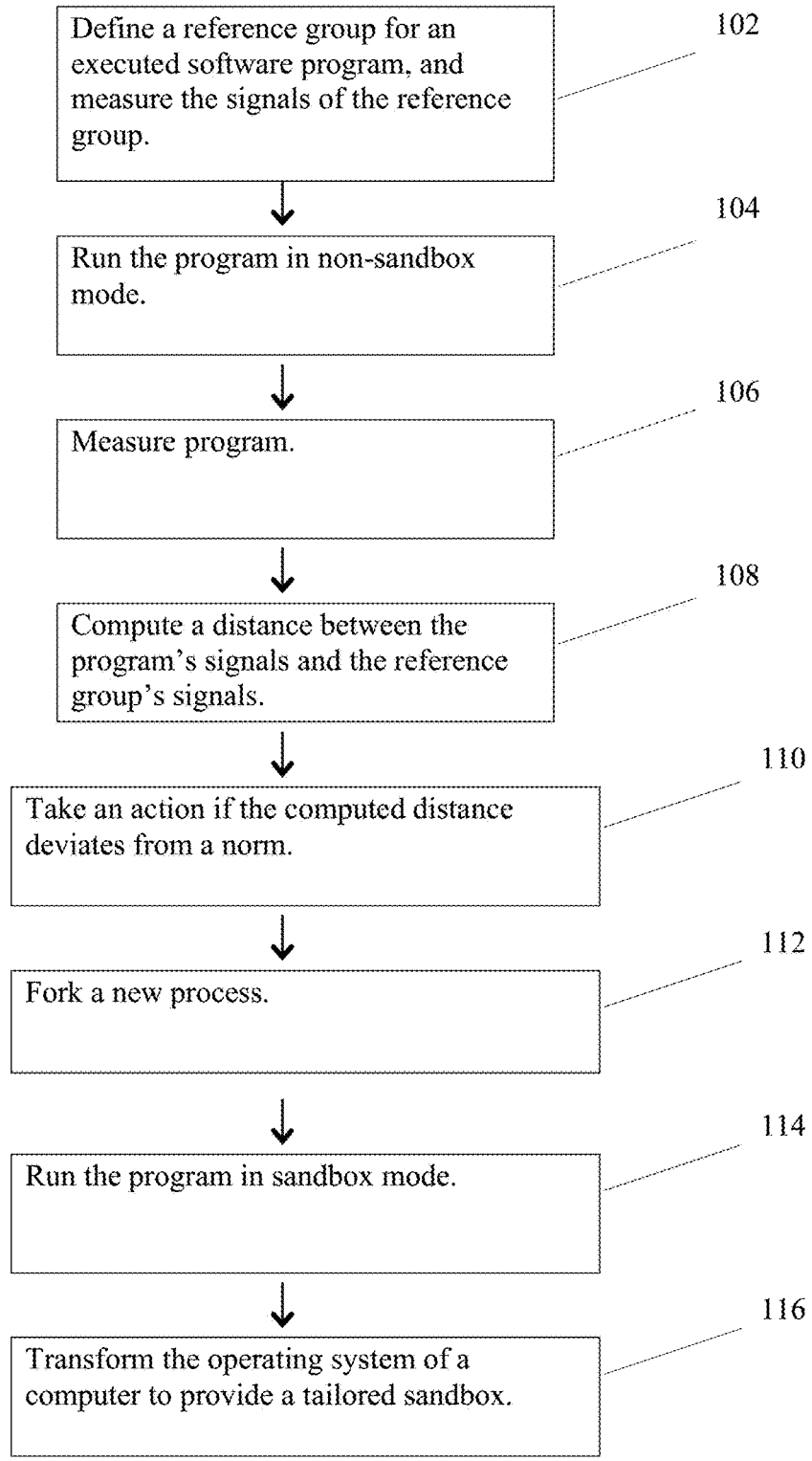
FIG. 1 is a flowchart of steps in a method for performing baseline calculations for firewalling.

Embodiments of the invention will be described below. The invention is not limited to these particular embodiments. The claims control the invention.

Embodiments of the present invention involve tailored sandboxing. Tailored sandboxes are adapted to the individual system which they are protecting, and learn and modify their rules based on actual behavior in the network and are tailored to the individual system.

Allocation of System Resources

At the outset of system initiation, it is helpful to assess the system environment so that the sandboxing system is aware of initialization constraints. One important use of system information is to allocate system resources. For example, if an exploit is only effective on a subset of versions which are present on a small set of computers, a decision may be made not to sandbox for those programs since even a successful attack would have minimal effect.

Another use is to decide which events/effects are common reaction in the system and to allocate less attention and system resources to these events/effects.

Multiple Modes

The use of local data to calibrate, prioritize and analyze sandbox parameters can be done in multiple ways. For example, one method is to do and utilize a one time calibration mechanism for the sandbox. Alternatively, another method is to do and utilize calibration on the fly in which at any given moment calibration of the sandbox is done compared to activities taken outside the sandbox. Of course, other time periods can be used, such as overnight updating based on previous days behavior.

Dynamic Firewall

A dynamic sandbox can be created, in which instead of warning/blocking or taking action based on absolute values of indicators, the sandbox learns from activities in the system which it is defending. Such knowledge can be used to calibrate.

Similarly, system knowledge can be used to create a dynamic firewall in which rules for allowing or disallowing network activity depends on the activity of other machines in the network. This allows us to reduce false positives while preventing more attacks.

Data Stored vs. Hash of Data Stored

While it is useful to store all of the data collected in the system, sometimes the amount of data can be large. In some cases the amount of data collected can be large. Thus in some cases it is worthwhile saving less data.

This can be done in multiple ways such as by saving a subset of the data or by saving hashes of the data. For example, a hash of the program memory can be saved, or some other function can be used.

Deviation from Mean

Once the baseline has been measured, alerts can be set or activity can be prohibited if it is far from the normal. The level and amount of deviance can vary. For example, even a single activity which is not standard can be prohibited. This is useful for things like memory overflows. Alternatively things whose amount is too large can be prohibited. For example, a larger number than average of login attempts can be prohibited based on what is average in the particular system. Other choices are also possible.

Spreading Deviations Across Network. Speed of Spread vs. Installation

Of course, it is also possible to benchmark spread of changes within a network as compared to the spread of contagion within other networks. Thus, if spread is faster within the given network a warning can be generated if spread is quicker than in the benchmarked and comparable general network.

Implementation

Figure 2:
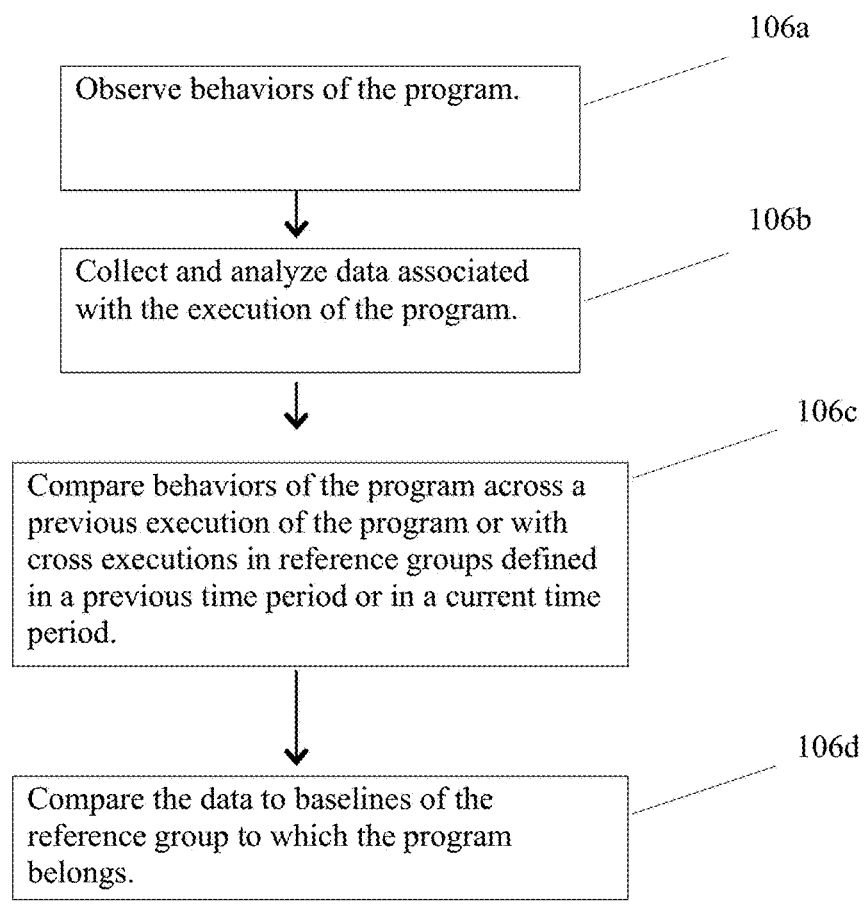
FIG. 2 is a flowchart of steps in a method for measuring a program, a submethod of the method for performing baseline calculations for firewalling.

FIG. 1 is a flowchart of steps in a method for performing baseline calculations for firewalling. FIG. 2 is a flowchart of steps in a method for measuring a program, a submethod of the method for performing baseline calculations for sandboxing.

1. For every execution, define a reference group for that execution (Step 102). The reference group can be defined using many different methods. For example, the reference group can be the set of programs that have similar names, locations, dates of installation or running. Reference groups can be hardwired (e.g. a list of comparable programs) static (i.e. determine by parameters of the program) or can be dynamic and depending on running parameters of the program. Signals of the reference group are then measured.

2. If the reference group is static it is computed once. If it is dynamic it can be calculated every time period or upon changes such as new events or other measurements. Other methods are also possible.

3. The programs can be run in sandbox mode in which the programs have no actual effect on the system or in a non-sandbox mode in which the program can affect the system.

4. In the Non-sandbox mode several steps are performed (Step 104):

Generally at most time periods: the program and applications are run normally (i.e., without a sandbox) and data is collected normally.

In this mode it is possible to observe such behaviors (Step 106*a*) as: System calls, File operations, Network activity, interprocess communication (IPC), electronic toll collection (ETC), input/output (IO) operations, computation time and other analysis.

Such data can be collected and analyzed (Step 106*b*) in a peer to peer network or can be collected and analyzed centrally. Data can be compared to baselines of the reference group to which the program belongs (Step 106*d*). In some cases, the reference group utilized for analysis can be limited to the part of the reference group which is available.

There are many ways to compare the sandbox to the reference group. For example, the probability of an event happening in the reference group can be calculated, and if the probability of the event in the reference group is significantly different than the probability in the sandbox several different actions can be taken, for example: set an alarm, halt the program, do not allow access, alert an administrator or take other actions.

Multiple events can be leveraged in many ways for example, the event which is the union of the event can be compared in the sandbox vs. the reference group or a union bound can be utilized.

Events can be given scores. For instance, the probability of the event happening or the probability multiplied by the potential damage. These scores can then be compared to define a risk.

Many other methods of risk assessment in sandboxes are known and are routinely used in estimation of the threats that a program has in a sandbox. These can all be utilized where the risk is restricted to a reference group which more closely mimics the actual environment.

In cases of multiple possible environments (e.g., a company running various versions of Windows), sandboxes can be employed using a reference group which is the more risky of the potential environments. Also a weighted average of the environments can be utilized. Or, reference environments can be used to combine multiple reference environments (e.g., multiple versions of Adobe acrobat).

Figure 6:
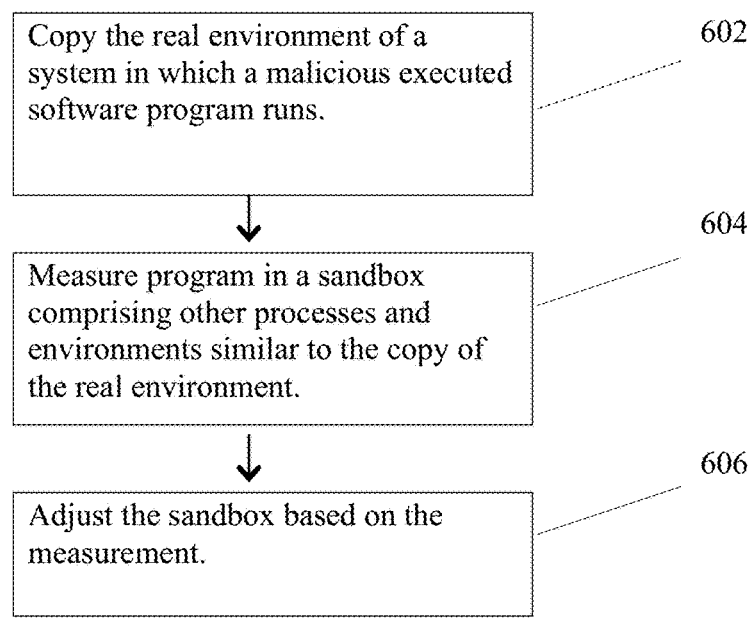
FIG. 6 is a flowchart of steps in an alternative method for performing baseline calculations for firewalling.

In some cases, reference groups are not needed. The issue is that in some cases it is *known* that an action is bad without a need for the reference group. However, usual sandboxes run on a much larger variety of environments than what is in the program. Refer to FIG. 6, which is a flowchart of steps in an alternative method for performing baseline calculations for firewalling. The key innovation is that the sandbox environment should be as similar to the actual environment as possible. Thus, there is advantage to copying the environment of the actual system even if no data is collected from the actual running of the system. As an example, the number and type of files in the sandbox should be similar to the number and type of files in the real environment. The types and versions of programs in the sandbox should be similar to that in the real environment.

In the case of a known bad issue (such as a buffer overrun) the advantage of a sandbox tailored to the actual environment is not in the similarity of the signals but in the reduction of number of cases which need to be checked. This tailoring allows longer running of programs in the sandbox as well as less false positives.

One special case which is worth explicitly mentioning is when the sandbox is an actual copy of a production machine. Of course, this faithful representation of the machine in the sandbox increases the fidelity of the sandbox to the actual system.

Step 602 is copying the real environment of a system in which a malicious executed software program runs. Step 604 is measuring the malicious program in a sandbox comprising other processes and environments similar to the copy of the real environment. Step 606 is adjusting the sandbox based on the measurement.

Figure 7:
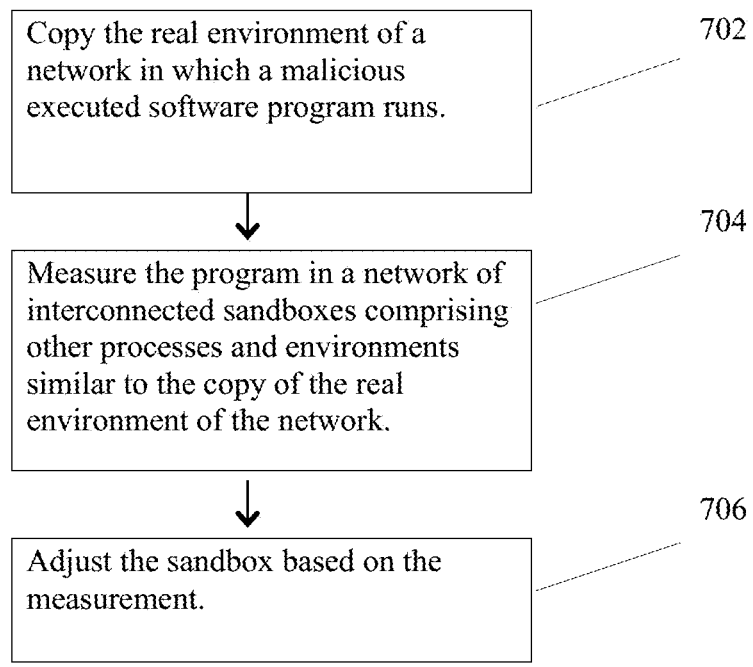
FIG. 7 is a flowchart of steps in a method for performing baseline calculations for firewalling, for tailoring the operations of a network of interconnected sandboxes.

It is also possible to create a network of sandboxes which are interconnected to mimic the actual network of the system. Refer to FIG. 7, which is a flowchart of steps in a method for performing baseline calculations for firewalling, for tailoring the operations of a network of interconnected sandboxes. In this case it is beneficial but not required for the connectivity of the sandbox network to mimic the connectivity of the actual network.

Step 702 is copying the real environment of a network in which a malicious executed software program runs. Step 704 is measuring the program in a network of interconnected sandboxes comprising other processes and environments similar to the copy of the real environment of the network. Step 706 is adjusting the sandbox based on the measurement.

The behavior of the program can be compared across the previous run of the program or with cross executions in reference groups either in previous time periods or in the current time period (Step 106c).

A distance can be computed (Step 108) between the measurement of the program (Step 106) and the reference group. One way of computing such a distance is to compute a similarity matrix. Many other ways of calculating distances or of comparing a run to a reference group can be utilized. The program is measured in a sandbox comprising other processes and environments similar to what is the actual expected environment where the program will be run. There are many ways of calculating similarity matrixes. For instance, see https://en.wikipedia.org/wiki/Similarity_measure (last accessed Dec. 16, 2016).

Such distances can be thresholded. E.g., when a distance is more than the standard deviation of the group, an action is taken (Step 110). An action can be prohibiting a nonstandard activity (useful for things like memory overflows), or prohibiting things whose amount is too large (e.g., a larger number than average of login attempts can be prohibited based on what is average in the particular system).

5. A sandbox can be run many times during a system process. For example, after forking a new process (Step 112) the program can be run in tailored sandbox mode (Step 114). In the tailored sandbox mode, the operations can be simulated in order to achieve a faster and less resource intensive operation, calculation and measurements.

Of course, there are other times in which a sandbox is run. For example, when a program is first run or detected, when a program is downloaded (as part of a firewall) or at other points.

In the tailored sandbox mode, the software and environment of the sandbox are based off of the actual software and environment of the real environment.

6. Then, transform the operating system of a computer to provide a tailored sandbox (Step 116).

Figure 3:
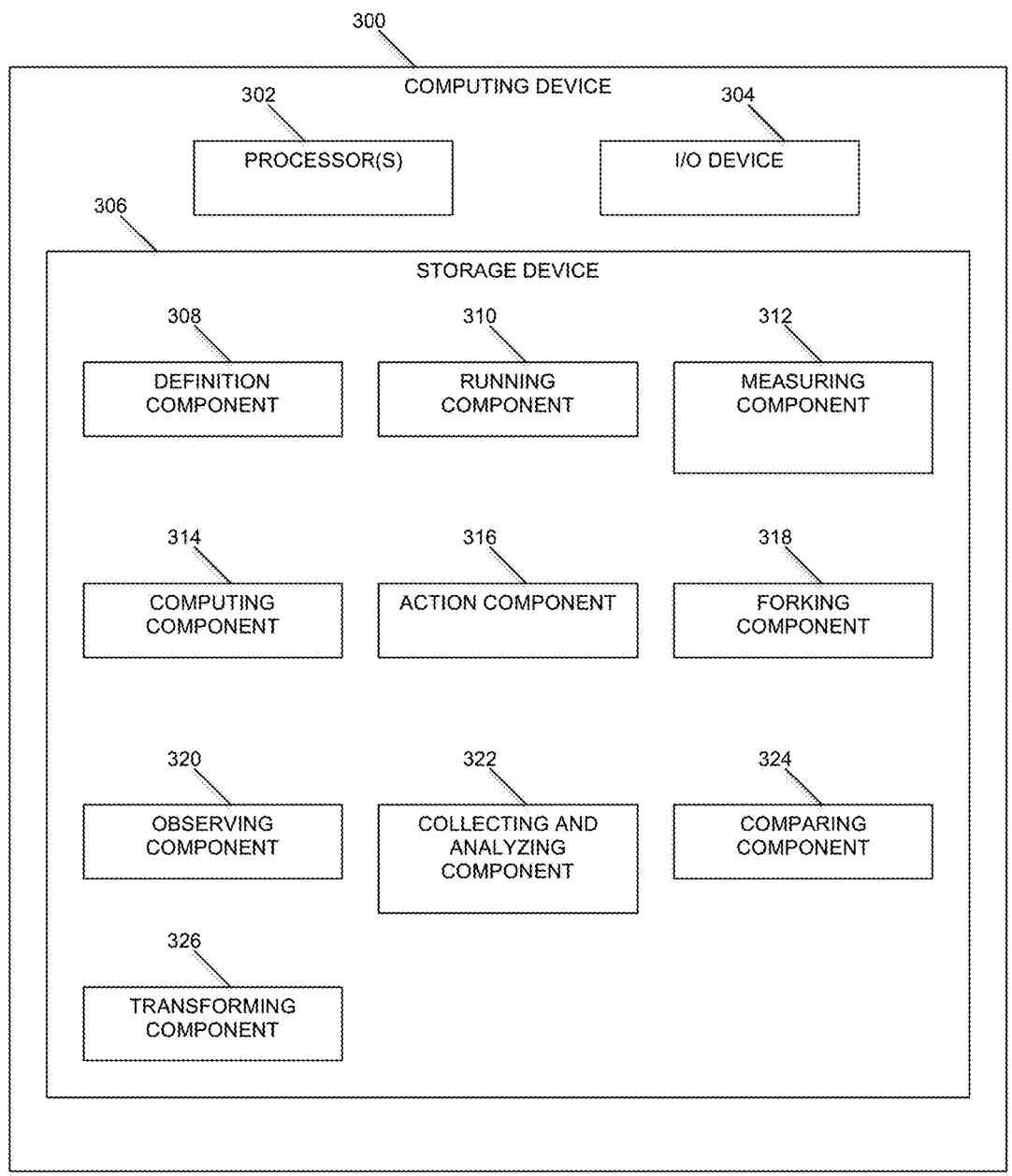
FIG. 3 is a block diagram of components in a computing device for baseline calculation for firewalling.

FIG. 3 is a block diagram of components in a computing device for baseline calculation for firewalling, in accordance with some exemplary embodiments of the disclosed subject matter. The invention may be implemented as one or more computing devices such as computing device 300, which may comprise one or more processors 302. Any of processors 302 may be a Central Processing Unit (CPU), a microprocessor, an electronic circuit, an Integrated Circuit (IC) or the like. Alternatively, computing device 300 can be implemented as firmware written for or ported to a specific processor such as a digital signal processor (DSP) or microcontrollers, or can be implemented as hardware or configurable hardware such as a field programmable gate array (FPGA) or application specific integrated circuit (ASIC). Processors 302 may be utilized to perform computations required by computing device 300 or any of its subcomponents.

In some embodiments, computing device 300 may comprise or be in communication with one or more input-output (I/O) devices 304 such as a terminal, a display for displaying an image, speakers, a microphone or another audio I/O devices or the like, a keyboard, a touch screen, an I/O device used for recognizing a person or interacting with the system, or the like.

Computing device 300 may comprise one or more storage devices 306 for storing executable components. Storage device 306 may also contain data during execution of one or more components. Storage device 306 may be persistent or volatile. For example, storage device 306 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 306 may retain program code operative to cause any of processors 302 to perform acts associated with any of the steps shown in FIGS. 1 and 2 above, for example defining a reference group for an executed software program, running the program in non-sandbox mode, or the like.

The components detailed below may be implemented as one or more sets of interrelated computer instructions, executed for example by any of processors 302 or by another processor. The components may be arranged as one or more executable files, dynamic libraries, static libraries, methods, functions, services, or the like, programmed in any programming language and under any computing environment. Storage device 306 may comprise or be loaded with one or more of the components, which can be executed on computing platform 300 by any one or more of processors 302. Alternatively, any of the executable components may be executed on any other computing device which may be in direct or indirect communication with computing platform 300.

Storage device 306 may comprise a definition component 308 for defining a reference group for an executed software program; a running component 310 for running the program in non-sandbox mode; a measuring component 312 for measuring the program; a computing component 314 for computing a distance between the program and the reference group; an action component 316 for taking an action if the computed distance deviates from a norm; a forking component 318 for forking a new process; an observing component 320 for observing behaviors of the program; a collecting and analyzing component 322 for collecting and analyzing data associated with the execution of the program; a comparing component 324 for comparing the behaviors of the program across a previous execution of the program or with cross executions in reference groups defined in a previous time period or in a current time period, and for comparing the data to baselines of the reference group to which the program belongs; and a transforming component 326 for transforming the operating system of a computer to provide a tailored sandbox.

Figure 4:
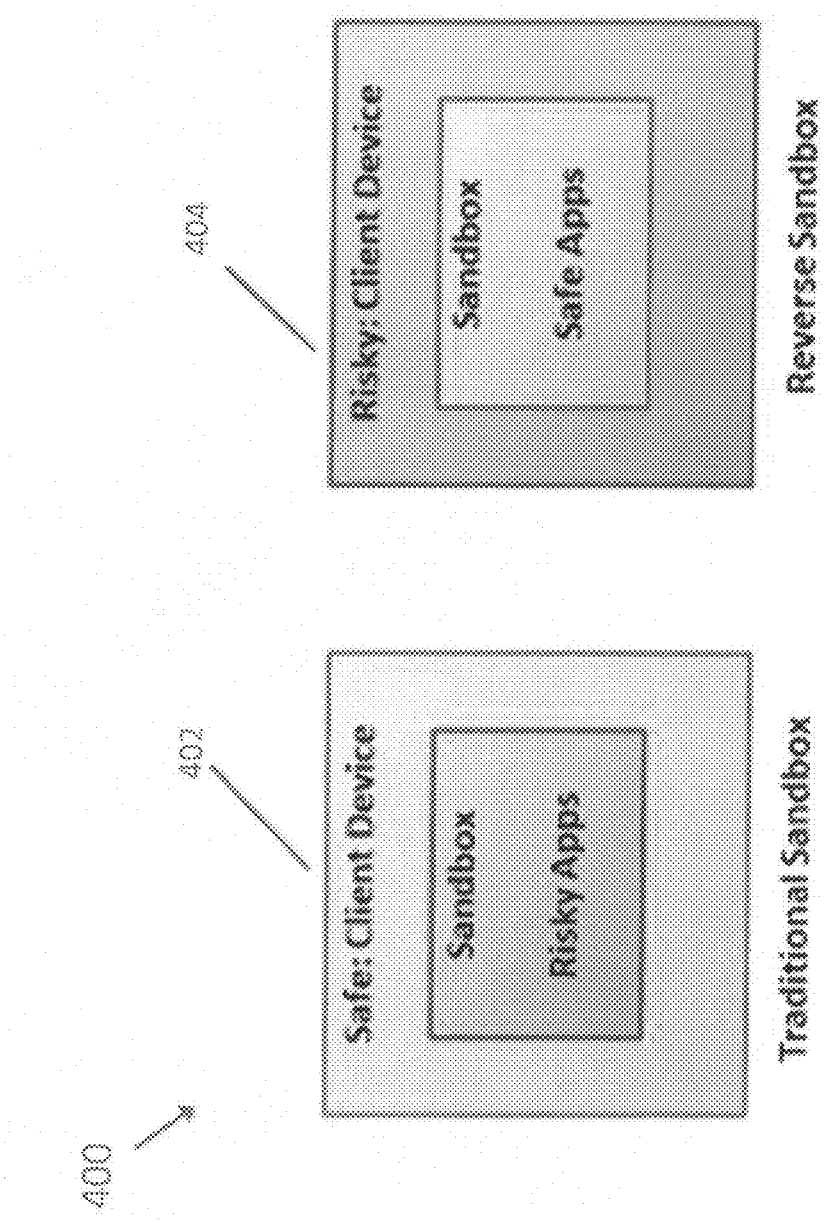
FIG. 4 is a block diagram illustrating a traditional and reverse sandbox.

FIG. 4 is a block diagram illustrating a traditional 402 and reverse 404 sandbox. In the traditional sandbox 402, risky applications are run inside the sandbox, while in a reverse sandbox 404, safe applications are run inside the sandbox.

Figure 5:
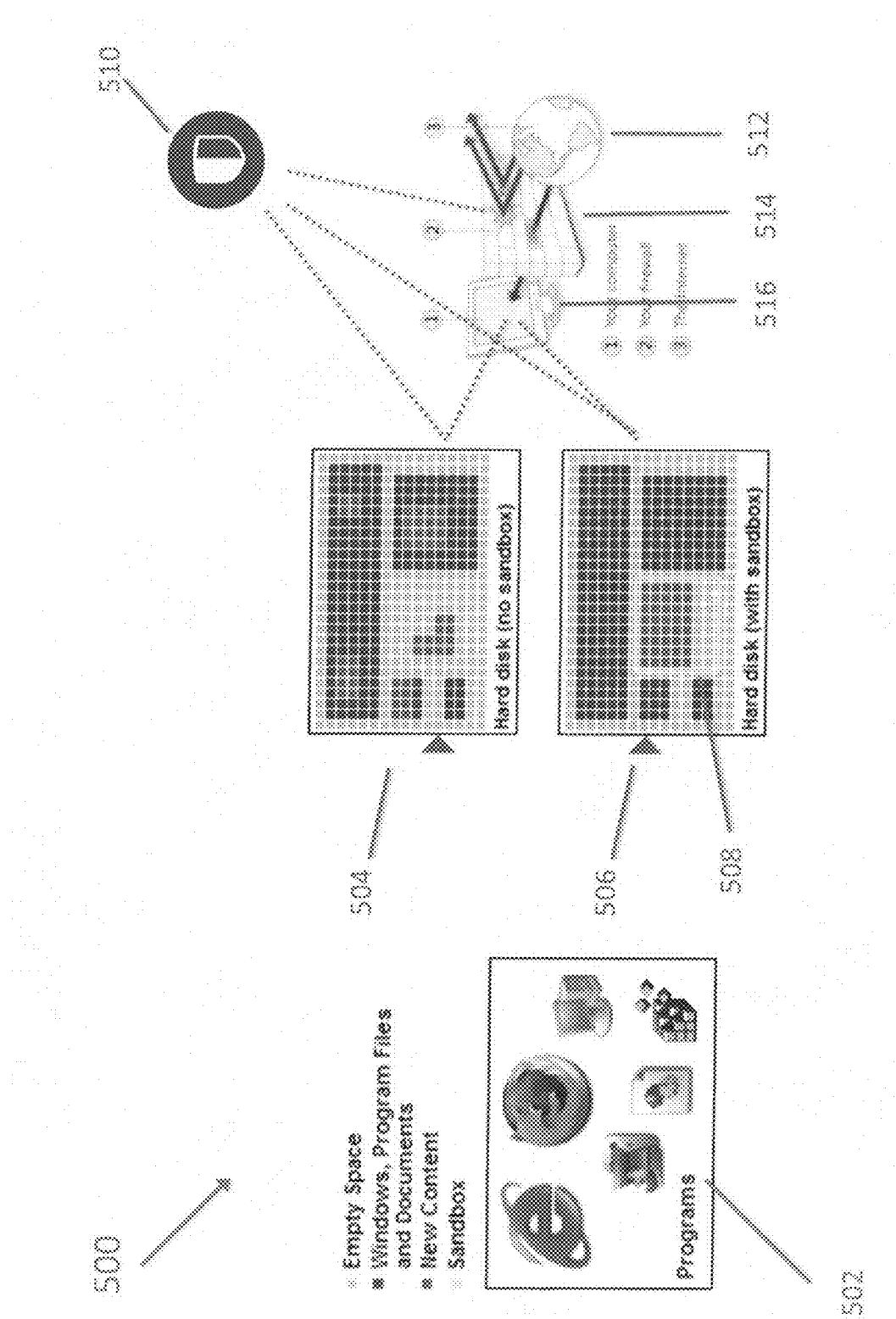
FIG. 5 is an architecture diagram illustrating a system for performing baseline calculations for firewalling.

FIG. 5 is an architecture diagram illustrating a system 500 for performing baseline calculations for firewalling. In the system, various programs 502 are run in non-sandbox mode 504 or in sandbox mode 506. The programs 502 are any type of software program, for example internet browsers, gaming applications, operating systems, plug-ins, office programs, etc. In the non-sandbox mode, new program content is run over the entire hard disk of computing device 516, while in sandbox mode the new program content is contained within the sandbox 508 on the hard disk of computing device 516. A firewall 514 exists between the internet 512 and various computing devices 516. The firewall 514 acts to safeguard the computing devices 516 from hazardous programs while allowing safe programs to run. Computing device 516 can be a standalone device or a network (wired, wireless, etc.) of various computing devices 516, and can be mobile (e.g., laptop, tablet, pda or mobile phone) or stationary (e.g., desktop or server) platforms. Item 510 is the method, computer program product, system and apparatus which implements baseline calculations for developing the firewall 514. Item 510 implements the algorithms described in FIGS. 1 and 2.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like, conventional procedural programming languages, such as the "C" programming language or similar programming languages, scripting languages such as Perl, Python, Ruby, or any other programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While the above specification and examples provide a description of the invention, many embodiments of the invention can be made without departing from the spirit and scope of the invention. It is to be understood that the foregoing embodiments are provided as illustrative only, and do not limit or define the scope of the invention. Various other embodiments are also within the scope of the claims.

What is claimed is:

1. A method for tailoring the operations of a sandbox on a computer or in a network of computers, comprising the steps of:
    collecting baseline data including which versions of programs are running on the computer or on different computers in the network of computers;
    defining a reference group, the reference group being a collection of software programs identified by the baseline data, wherein the reference group identifies a set of programs that have similar names, locations, dates of installation or dates of running;
    collecting a first set of nonsandbox signals from execution of software programs identified within the reference group by executing programs from the collection of software programs that form the reference group, the first set of nonsandbox signals including at least one of: system calls, file operations, network activity, inter-process communication, electronic toll collection, input and output operations, or computation time;
    sandboxing the reference group to represent an expected operating environment where programs identified in the reference group will run, the expected operating environment derived from the baseline data;
    executing the programs identified in the reference group in the sandbox and collecting a second set of sandbox signals from the sandbox representing execution of said programs identified in the reference group in the expected operating environment;
    computing a distance between the second set of sandbox signals from the sandbox and the first set of nonsandbox signals from the reference group; and taking an action if the distance is greater than a predetermined threshold.

2. The method of claim 1, wherein the collecting steps comprise:
    observing behavior of a program, including memory requests, service calls, input-output requests, or network access;
    comparing the behavior of the program with those of a previous execution of the program, or with cross executions of other programs in the reference group.

3. The method of claim 1, wherein the distance is computed using a similarity matrix.

4. The method of claim 1, wherein the first and second set of signals are collected and analyzed in a distributed peer-to-peer network or on a centralized server.

5. The method of claim 1, further comprising the steps of:
    benchmarking a spread of changes within a network as compared to the spread of contagion within other networks; and
    generating a warning if the spread of changes within a network is faster than the spread of contagion within other networks.

6. The method of claim 1, wherein system knowledge is used to create a dynamic firewall in which rules for allowing or disallowing network activity depends on the activity of other machines in the network.

7. The method of claim 1, wherein collecting a large amount of data is performed by saving a subset of the data, saving hashes of the data, or creating and saving one or more functions of the data.

8. The method of claim 1, wherein taking an action is prohibiting an activity.

9. A non-transitory computer program product for tailoring the operations of a sandbox on a computer, comprising:
    a non-transitory computer readable medium;
    a first program instruction for defining a reference group, the reference group being a collection of software programs similar to one another according to a characteristic;
    a second program instruction for collecting a first set of nonsandbox signals of the reference group by executing programs from the collection of software programs that form the reference group;
    a third program instruction for sandboxing to represent an expected operating environment where the programs of the reference group will run;
    a fourth program instruction for executing the programs of the reference group in the sandbox and collecting a second set of sandbox signals from the sandbox representing execution in the expected operating environment;
    a fifth program instruction for computing a distance between the second set of sandbox signals from the sandbox and the characteristic signals for the reference group; and
    a sixth program instruction for taking an action if the distance is greater than a predetermined threshold;
    wherein said first, second, third, fourth, fifth and sixth, program instructions are stored on said non-transitory computer readable medium.

10. The non-transitory computer program product of claim 9, wherein the collecting program instruction comprises the steps of
    observing behavior of a program, including memory requests, service calls, input-output requests, and network access;
    comparing the behavior of the program with those of a previous execution of the program, or with cross executions of other programs in the reference group.

11. The non-transitory computer program product of claim 9, wherein the distance is computed using a similarity matrix.

12. The non-transitory computer program product of claim 9, wherein the first and second set of signals are collected and analyzed in a distributed peer-to-peer network or on a centralized server.

13. The non-transitory computer program product of claim 9, wherein the reference group characteristic is one or more of similar names, locations, dates of installation or dates of running.

14. The non-transitory computer program product of claim 9, further comprising computer instructions for:
    benchmarking a spread of changes within a network as compared to the spread of contagion within other networks; and
    generating a warning if the spread of changes within a network is faster than the spread of contagion within other networks.

15. The non-transitory computer program product of claim 9, wherein system knowledge is used to create a dynamic firewall in which rules for allowing or disallowing network activity depends on the activity of other machines in the network.

16. The non-transitory computer program product of claim 9, wherein collecting a large amount of data is performed by saving a subset of the data, saving hashes of the data, or creating and saving a function of the data.

17. The non-transitory computer program product of claim 9, wherein taking an action is prohibiting an activity.

18. An apparatus having a processing unit and a storage device, the apparatus comprising:
- a defining component for defining a reference group, the reference group being a collection of software programs similar to one another according to a characteristic;
- a collecting component for collecting a first set of non-sandbox signals of the reference group by executing programs from the collection of software programs that form the reference group;
- a sandboxing component for generating a sandbox to represent an expected operating environment where the programs identified by the reference group will run;
- an executing component for executing programs in the sandbox and collecting a second set of sandbox signals from the sandbox representing execution of the target program in the expected operating environment;
- a computing component for computing a distance between the second set of sandbox signals from the sandbox and the first set of nonsandbox signals from the reference group; and
- an action component for taking an action if the distance is greater than a predetermined threshold.

19. The apparatus of claim 18, wherein the number and type of files in the sandbox are similar to the number and type of files in the real environment.

20. The apparatus of claim 18, wherein the types and versions of programs in the sandbox are similar to the types and versions of programs in the real environment.

21. The apparatus of claim 18, further comprising tailoring operations of the sandbox by:
- copying a real system environment in which a target program runs into the sandbox:
- measuring signals from the target program in the sandbox and
- adjusting the sandbox based on said measuring, wherein the tailored sandbox results in longer running of programs in the sandbox as well as fewer false positives.

22. The apparatus of claim 18, wherein the sandbox is an actual copy of a production machine.

\* \* \* \* \*